United States Patent Office 3,138,451
Patented June 23, 1964

3,138,451
PROCESS FOR THE REDUCTION OF IRON ORES CONTAINING FERROUS OXIDE
Rudolph H. Gerlach, Bottrop, Westphalia, Germany, assignor to Beteiligungs- und Patentverwaltungsgesellschaft mit beschrankter Haftung, Essen, Germany
No Drawing. Filed May 2, 1960, Ser. No. 25,873
Claims priority, application Germany May 12, 1959
2 Claims. (Cl. 75—33)

This invention relates to a new process for the recovery of elemental iron from ores containing ferrous oxide, in particular, those ores wherein the ferrous oxide is complexed with other oxides.

In general, ores such as magnetite, ilmenite and fayalite containing ferrous oxide are difficult to convert to elemental iron. This is particularly the case when the reduction of said ores is conducted at temperatures below the melting point of the iron. For example, in the Krupp-Renn method of reducing iron ores, a substantial amount of the iron in the ore is not reduced to the metal.

The object of the present invention is, therefore, to provide a process which results in a higher recovery of elemental iron from ores containing ferrous oxide.

Upon further study of the specification and appended claims, other objects and advantages of this invention will become apparent.

To attain these objects, the ores containing ferrous oxide are treated in the following manner:

(1) The ore is mixed with an alkali compound in a ratio of about up to 6 parts alkali compound to 100 parts by weight of ore.

(2) The mixture is heated in an oxidizing atmosphere in order to change the ferrous oxides to ferric oxides.

(3) The oxidized ore is then reduced, this invention being particularly advantageous when the ore is reduced by a method wherein temperatures are below the melting point of the iron, such as in the Krupp-Renn method.

With respect to step (1), among those alkali metal compounds which are suitable for the purposes of the present invention are: sodium carbonate, caustic soda, rock salt, potassium carbonate, caustic potassium.

It is preferred to dissolve the alkali compound in an aqueous solution in order to facilitate the homogeneous distribution of the alkali compound in the ore. To accomplish this, it is preferable to use a saturated aqueous solution. At 35° C. a saturated aqueous solution contains about 35% calcined potassium carbonate. The ratio of solution to ore being in this case about 6 to 12 parts solution to 100 parts by weight of ore. The preferred ratio of dry alkali compound to ore being in the case of potassium carbonate 2 to 4 parts to 100 parts by weight of ore.

With respect to step (2), the ore is preferably oxidized in a rotary kiln, wherein it is preferred to reduce the ferrous oxide content of the ore to less than 2%.

Among the oxidizing atmospheres that can be used to accomplish this oxidation step are: air, other gases containing molecular oxygen, ozone and liquid and solid oxidizing agents. For reasons of economics, it is generally preferred to utilize air.

The ore is usually heated in this oxidizing environment to a temperature of 800 to 1000° C. for a period of about 10 minutes to several hours depending on the temperature grain size and other conditions.

With respect to step (3), it is preferred to treat the ore immediately after the oxidation step in order to save the heat content of the mass. This can be accomplished by reducing the ore in a rotary kiln by adding solid reduction fuel, and processing in the conventional Krupp-Renn method or a method for the production of sponge iron. For a detailed teaching of the Krupp-Renn process, reference is directed to United States Patent specifications Nos. 1,964,917, 2,026,683 and 2,709,650; and also to the comprehensive article in the periodical, The Iron Age, May 9, 1946, pages 70–75.

Briefly, the Krupp-Renn process comprises the steps of (1) preparing a granular mixture comprised of ore, a carbonaceous reducing material, and, in some instances, slag-forming materials; (2) reducing said mixture in a rotary kiln to form sponge-iron, the resultant reduced mixture being heated to a temperature of 900–1400° C. under an oxidizing atmosphere while being balled and fused together into lumps in the semi-liquid slag; and (3) after the resultant mixture is removed from the kiln, the lumps of iron are removed from the slag. With respect to the employment of an oxidizing atmosphere in the high-temperature balling step, it is to be noted that this atmosphere exists above the mixture, but within the mixture there is a reducing atmosphere because of the formation of carbon monoxide. Consequently, at the surface of the mixture a small portion of the sponge-iron is oxidized and then as it, by agitation, passes into the interior of the mixture, it is reduced because of the presence of the reducing agent—this ultimate oxidation and reduction aspect being essential to the success of the balling process.

To exemplify the present invention, the following specific embodiment is presented which is to be considered non-limitative of the appended claims.

Example 1

An ilmenite ore concentrate analyzing as follows in percent by weight:

| | Percent |
|---|---|
| FeO | 34.2 |
| $Fe_2O_3$ | 12.5 |
| $SiO_2$ | 2.8 |
| MgO | 3.8 |
| $Al_2O_3$ | 0.8 |
| $TiO_2$ | 44.0 |
| CaO | 0.4 |
| MnO | 0.4 | is mixed with about 3% soda by weight by soaking it with a saturated aqueous soda solution. The ore is then introduced into the revolving rotary kiln and heated in an oxidizing atmosphere to 950° C. The oxidizing ore is then reduced in a CO stream at 900° C. for 180 minutes. An analysis of the reduced ore showed that 65% of the iron is converted into elemental iron.

Example 2

A sample of the same raw material as treated in Example 1 is treated in accordance with the same conditions as Example 1, with the exception that the addition of any alkali compound is eliminated. An analysis of the reduced ore shows that it is only 50% reduced.

Example 3

Another sample of the same raw material as treated in Example 1 is reduced in accordance with the same conditions of Example 1, with the exception that both the addition of the alkali compound and the oxidation step are eliminated. An analysis of the reduced ore shows that it is only 20% reduced.

It is believed that the foregoing examples clearly demonstrate the necessity of both mixing the ore with an alkali compound and oxidizing it prior to the reduction. It appears that these two steps so affect the crystal lattice of the ore that reduction is facilitated.

It will be understood that the invention is susceptible to modification in order to adapt it to different usages and conditions and, accordingly, it is desired to comprehend such modifications within the invention may fall within the scope of the appended claims.

What I claim is:

1. In a process for recovering elemental iron by the reduction of an ore comprising a ferrous oxide mineral selected from the group consisting of magnetite, ilmenite and fayalite, which process comprises the steps of preparing a granular mixture which comprises ore and a carbonaceous reducing material; reducing said granular mixture in a rotary kiln to produce sponge-iron; heating the resultant mass containing the sponge-iron to 900–1400° C., while balling and fusing the particles of sponge-iron into lumps in the semi-liquid slag; removing the resultant mixture of lumpy sponge-iron and slag from the kiln, and removing the lumpy sponge-iron from the slag, the improvement which consists essentially of preceding said reduction with the steps of mixing said ore with about up to six parts sodium carbonate per 100 parts by weight of the ore, and heating said mixture in an oxidizing atmosphere at about 800 to 1000° C. so that the ferrous oxide is substantially oxidized to ferric oxide.

2. The process of claim 1 wherein the mineral is ilmenite.

References Cited in the file of this patent

UNITED STATES PATENTS

| | | |
|---|---|---|
| 2,085,178 | Acken | June 29, 1937 |
| 2,282,124 | Fahrenwald | May 5, 1942 |
| 2,792,298 | Freeman | May 14, 1957 |